United States Patent [19]
Gill et al.

[11] Patent Number: 6,146,555
[45] Date of Patent: Nov. 14, 2000

[54] BROMINATED COPOLYMER FLAME RETARDANT ADDITIVES HAVING IMPROVED COLOR CHARACTERISTICS AND RELATED METHOD

[75] Inventors: James C. Gill, Macedonia; James L. Dever, Medina, both of Ohio

[73] Assignee: Ferro Corporation, Cleveland, Ohio

[21] Appl. No.: 09/008,767

[22] Filed: Jan. 19, 1998

[51] Int. Cl.$^7$ ........................... C09K 21/00; C08F 12/16; C08F 14/04
[52] U.S. Cl. ........................... 252/609; 252/601; 252/20; 526/293; 526/296
[58] Field of Search ........................... 252/20, 601, 609; 526/293, 296

[56] References Cited

U.S. PATENT DOCUMENTS

| | | | |
|---|---|---|---|
| 4,200,703 | 4/1980 | Diebel et al. | 525/357 |
| 4,352,909 | 10/1982 | Barda et al. | 525/157 |
| 5,290,636 | 3/1994 | Rose et al. | 526/293 |
| 5,565,538 | 10/1996 | Zingde et al. | 526/293 |
| 5,637,650 | 6/1997 | Gill et al. | 525/356 |
| 5,677,390 | 10/1997 | Dadgar et al. | 525/355 |
| 5,686,538 | 11/1997 | Balhoff et al. | 525/355 |
| 5,723,549 | 3/1998 | Dever et al. | 525/333.4 |
| 5,726,252 | 3/1998 | Gill et al. | 525/332.2 |

FOREIGN PATENT DOCUMENTS 0 201 411  12/1986  European Pat. Off. .
92/04417   3/1992   WIPO .

Primary Examiner—Jill Warden
Assistant Examiner—Monique T. Cole
Attorney, Agent, or Firm—Renner, Kenner, Greive, Bobak, Taylor & Weber

[57] ABSTRACT

A flame retardant additive comprising a brominated copolymer, wherein the copolymer is a copolymer of styrene and an acrylate or methacrylate monomer defined by the formula where $R_1$ is a methyl group or hydrogen and $R_2$ is an organic group having between one and about 18 carbon atoms. A method for imparting flame retardancy to a thermoplastic material without deleteriously impacting the color thereof comprises the step of adding a brominated copolymer to the thermoplastic material, wherein the copolymer is a copolymer of styrene and an acrylate or methacrylate monomer defined by the formula where $R_1$ is a methyl group or hydrogen and $R_2$ is an organic group having between one and about 18 carbon atoms. The present invention also includes a brominated copolymer of styrene and an acrylate or methacrylate monomer.

11 Claims, No Drawings

BROMINATED COPOLYMER FLAME RETARDANT ADDITIVES HAVING IMPROVED COLOR CHARACTERISTICS AND RELATED METHOD

TECHNICAL FIELD

Brominated polystyrene is used as an additive to thermoplastics to impart flame retardant properties. It is necessary and desirable for these additives to not detract from the inherent color of the thermoplastic. Accordingly, this invention generally relates to a brominated polystyrene having improved color. More particularly, the present invention is directed toward copolymers of styrene and acrylate or methacrylate monomers wherein the arene portion of the copolymer has been brominated. Specifically, the present invention is directed toward brominated copolymers of styrene and acrylate or methacrylate monomers that are particularly useful as flame retardant additives for thermoplastics.

BACKGROUND OF THE INVENTION

It is common in the art to brominate polystyrene and use the brominated polystyrene as a flame retardant additive in thermoplastics. Commercially, such brominated polystyrene can be obtained from the Ferro Corporation of Cleveland, Ohio. This product is sold under the tradename PyroChek® 68PB.

When brominated polystyrene is employed as a flame retardant additive in thermoplastics, its color is a property of primary importance to the manufacturer of the thermoplastic materials. The thermoplastic manufacturer desires to produce the thermoplastic articles in a wide range of colors. The more colored an additive, the more difficult it is to match (produce) a broad range of colors. The more lightly colored the additive, the easier it becomes to produce a wide range of colors.

A problem encountered in producing brominated polystyrenes is that the bromination causes coloration of the brominated polystyrene product. The degree of color formation depends upon the processing conditions. For example, the use of higher temperatures, stronger catalysts, bromine versus bromine chloride as the brominating agent, even the method of product isolation, all effect changes in the color of the product. While lower temperatures provide products having better color, the trade-off is in longer reaction times and concurrent lower product output per shift.

Therefor, in recognition of the needs of the thermoplastic product manufacturer and, in view of the known deficiencies of brominated polystyrenes, a need exists for a highly brominated polystyrene product with an improved light appearance as manufactured so that the end user can formulate a wide range of colors and thereby better meet the needs and demands of the marketplace.

SUMMARY OF INVENTION

It is therefore, an object of the present invention to provide a brominated polystyrene copolymer having improved color.

It is another object of the present invention to provide a brominated polystyrene copolymer useful as a flame retardant additive for thermoplastics.

It is yet another object of the present invention to provide a brominated polystyrene copolymer that has as light a color as possible.

It is still another object to provide a brominated polystyrene copolymer that can be used in lieu of brominated polystyrene.

It is another object of the present invention to provide a method of imparting flame retardancy to thermoplastic materials involving the use of brominated polystyrene copolymers.

At least one or more of the foregoing objects, together with the advantages thereof over the known art relating to brominated polystyrenes, which shall become apparent from the specification that follows, are accomplished by the invention as hereinafter described and claimed.

In general the present invention provides a flame retardant additive comprising a brominated copolymer, wherein said copolymer is a copolymer of styrene and an acrylate or methacrylate monomer defined by the formula

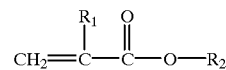

where $R_1$ is a methyl group or hydrogen and $R_2$ is an organic group having between one and about 18 carbon atoms.

The present invention also includes a method for imparting flame retardancy to a thermoplastic material without deleteriously impacting the color thereof comprising the step of adding a brominated copolymer to the thermoplastic material, wherein the copolymer is a copolymer of styrene and an acrylate or methacrylate monomer defined by the formula

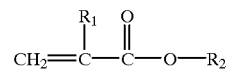

where $R_1$ is a methyl group or hydrogen and $R_2$ is an organic group having between one and about 18 carbon atoms.

The present invention also includes a brominated copolymer of styrene and an acrylate or methacrylate monomer defined by the formula

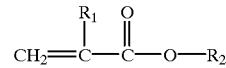

where $R_1$ a methyl group or hydrogen and $R_2$ is an organic group having between one and about 18 carbon atoms.

PREFERRED EMBODIMENT FOR CARRYING OUT THE INVENTION

Brominated polystyrene products, marketed primarily as PyroChek® 68PB by Ferro Corporation, the Assignee of record herein, has been a leading flame retardant additive for engineering thermoplastics for many years. As currently produced, it has a color ΔE of 24 to 30, measured as a solution in chlorobenzene and compared to the color of pure chlorobenzene. Total Color Difference (ΔE) is determined using the Hunter L, a, b scales, for product solutions in chlorobenzene.

The polystyrene reactant that is employed may be either an oligomer or a polymer. Accordingly, the initial molecular weight of the polystyrene is from about 500 $\overline{M}w$ to about 1,500,000 $\overline{M}w$ and preferably from about 500 $\overline{M}w$ to about 500,000 $\overline{M}w$.

The reaction is carried out to introduce up to three bromine atoms on each aromatic nucleus. Hydrogen chloride or hydrogen bromide is produced as a byproduct of the reaction, depending upon whether bromine chloride or bromine is used.

It has now been discovered that the bromination of copolymers of styrene and acrylate or methacrylate monomers occurs with minimal color formation of the brominated copolymer. This unexpected discovery is particularly advantageous because the brominated copolymers can be used in lieu of brominated polystyrene product, especially in situations where little color contribution is desirable or required. Accordingly, the present invention is directed toward brominated polystyrene copolymers. Inasmuch as brominated polystyrene is useful as a flame retardant additive for engineering thermoplastics, the present invention is also directed toward the use of brominated copolymers as flame retardant additives.

In a preferred embodiment of the present invention, the copolymers employed are those polymerized from styrene and acrylate or methacrylate monomers. More specifically, the acrylate and methacrylate monomers that are copolymerized with styrene to form the copolymers employed in the present invention can be defined by the following formula

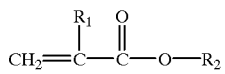

where $R_1$ is a methyl group or hydrogen and $R_2$ is an organic group having between 1 and about 18 carbon atoms. Preferably, $R_2$ is an alkyl group having between 1 and about 18 carbon atoms, and more preferably $R_2$ is an alkyl group having between about one and about four carbon atoms.

Specific examples of useful acrylate and methacrylate monomers include methyl methacrylate, methyl acrylate, ethyl acrylate, n-butyl acrylate, isodecyl methacrylate, lauryl methacrylate, and stearyl methacrylate. It should be understood that the foregoing examples are merely exemplary and that the present invention should not be limited thereto. Those monomers that are particularly preferred are acrylate and methacrylate esters in which the ester group contains one to four carbon atoms.

The copolymers useful in the present invention are preferably random copolymers. It is particularly preferred that the copolymers include at least 80 percent by weight styrene, more preferably at least 90 percent by weight styrene, and even more preferably at least 95 percent by weight styrene.

The copolymers of the present invention can be brominated by any of the numerous techniques known in the art for brominating polystyrene containing monomers or polymers. Such techniques include, but are not limited to, the use of bromine chloride as the brominating agent. This technique is described in U.S. Pat. No. 4,352,909, which is incorporated herein by reference. Patents teaching other techniques are also disclosed in U.S. Pat. No. 4,352,909.

As generally discussed above, the brominated copolymers of the present invention are particularly advantageous because they are light colored. For purposes of describing the present invention, color shall be defined in terms of Total Color Difference (ΔE), which is determined using the Hunter L, a, b scales for product solutions in chlorobenzene. ΔE is representative of an amount of color associated with a compound in chlorobenzene as compared to the color of pure chlorobenzene.

The brominated copolymers of the present invention preferably have a ΔE, measured in a 10 percent solution of chlorobenzene, of less than about 20, more preferably less than about 10, and even more preferably less than about 5.

In order to demonstrate the practice of the present invention, the following examples have been prepared and tested as described in the General Experimentation section disclosed hereinbelow. The examples should not, however, be viewed as limiting the scope of the invention. The claims will serve to define the invention.

GENERAL EXPERIMENTATION

Seventeen styrene containing copolymers were either purchased or prepared via known techniques. Twenty-seven experimental brominations were conducted. Also brominated were two samples of polystyrene.

Bromination of Styrene (Meth)acrylate Copolymers

Bromination of all of the above identified copolymers occurred in an analogous manner to the bromination of styrene methyl methacrylate copolymer, which is described hereinbelow. Those skilled in the art will be able to use the description provided hereinbelow to brominate any of the given copolymers embodied in the present invention.

In general, styrene methyl methacrylate (80:20) was dissolved in 1,2 dichloroethane (EDC). Water was then azeotropically removed from the system. Antimony trichloride was then added as a catalyst, followed by the addition of bromine chloride. The solution was allowed to react at around room temperature for several hours.

Aqueous sodium bisulfite was added in order to quench the reaction. The product, which was contained in an organic layer of a multilayer system, was separated and washed. The organic layer was then added to boiling water in order to remove the organic solvent. The resulting slurry was maintained at about 100° C. for one hour, following which time the product was collected by filtration.

More specifically, into a 5 L resin flask equipped with a heater mantle with a controller, mechanical stirrer, thermometer, distillation head with a vertical sidearm take-off tube (Lab Glass LG-1781T), spiral condenser, and a 500 mL jacketed pressure equalized addition funnel was placed a suitably sized weight of styrene methyl methacrylate (80:20) copolymer such that there was 100.2 g of styrene repeating units (0.962 mole based upon styrene repeating units) and 3085 mL of dichloroethane (EDC). With stirring the solution was heated to reflux and 60 ml of EDC/$H_2O$ was removed in order to azeotropically remove water from the system. The solution was cooled to 20° C. and 15 g (0.06576 mole) antimony trichloride (added as a solution in EDC—0.4 mL) was added. A bromine chloride solution comprising 375 g (3.25 mole) bromine chloride, 5.4 g (0.0338 mole) bromine and 375 g EDC was added continuously to the polystyrene solution over three hours while maintaining the bromination temperature at 20° C.±2° C. The system was typically stirred for approximately two more hours in order to achieve a bromine content in the polystyrene portion of the final product of 66 percent minimum (total bromination time was approximately 5 hours).

Aqueous sodium bisulfite 760–770 g (10 percent by weight) was added at such a rate as to not exceed 35° C. The mixture was stirred for an additional 10–15 minutes and then transferred to a 2 L separator funnel.

The organic layer was removed and washed three times with 1 L fresh deionized water. During the third wash, the pH of the aqueous layer was adjusted to approximately seven to eight by the incremental addition of saturated aqueous sodium bicarbonate solution. After the third wash, the organic phase was placed in an appropriately sized additional funnel. This was added to a 3 L Morton resin flask equipped with a mechanical stirrer, distillation head, condenser, receiver, and heating mantle. The flask also contained 2 L boiling deionized water which was being vigorously agitated. During the addition of the solution to the boiling water, the EDC flashed off as a EDC/water azeotrope.

The temperature during this operation was maintained between 91° C. and 100° C. When the addition of the solution was completed, the resulting slurry was held at approximately 100° C. for an additional hour.

The product was collected by filtration, washed on the filter with 4 L hot deionized water and then 4 L cold deionized water. The product was vacuum dried at 100° C. at 5–10 torr for 48 hours. The yield of product was around 90–95%.

Irrespective of the bromine content in the polystyrene portion of the copolymer product, it will be appreciated that the bromine content of the copolymer product will be lower because the (meth)acrylate monomer does not become brominated. Accordingly, the bromine content for the copolymer product will vary, depending upon the amount of bromination and the amount of (meth)acrylate monomer present; however, for a useful product the bromine content of the copolymer should be at least about 52 percent by weight.

Bromination of Polystrene

Into a 1 L resin flask equipped with a heater mantle with a mechanical stirrer, thermometer, spiral condenser, and a 500 mL jacketed pressure equalized addition funnel was placed 50.1 g (0.481 mole based upon styrene repeating units) of polystyrene and 350 mL of dichloroethane (EDC). To the stirred solution was added 2.5 g (0.0196 mole) antimony trichloride (added as a solution in EDC—0.2 g/mL) and the solution was cooled to 20° C. A bromine chloride solution comprising 187.5 g (1.625 mole) bromine chloride, 2.7 g (0.0169 mole) bromine and 187.5 g EDC was added continuously to the polystyrene solution over three hours while maintaining the bromination temperature at 20° C.±2° C. The system was typically stirred for approximately two more hours in order to achieve a bromine content in the polystyrene portion of the final product of 66 percent minimum (total bromination time was approximately 5 hours).

Aqueous sodium bisulfite 180 g (20 percent by weight) was added at such a rate as to not exceed 35° C. The mixture was stirred for an additional 10–15 minutes and then transferred to a 2 L separator funnel.

The organic layer was removed and washed three times with 1 L fresh deionized water. During the third wash, the pH of the aqueous layer was adjusted to approximately seven to eight by the incremental addition of saturated aqueous sodium bicarbonate solution. After the third wash, the organic phase was placed in an appropriately sized additional funnel. This was added to a 3 L Morton resin flask equipped with a mechanical stirrer, distillation head, condenser, receiver, and heating mantle. The flask also contained 2 L boiling deionized water which was being vigorously agitated. During the addition of the solution to the boiling water, the EDC flashed off as an EDC/water azeotrope.

The temperature during this operation was maintained between 91° C. and 100° C. When the addition of the solution was completed, the resulting slurry was held at approximately 100° C. for an additional hour.

The product was collected by filtration, washed on the filter with 4 L hot deionized water and then 4 L cold deionized water. The product was vacuum dried at 100° C. at 5–10 torr for 48 hours. The yield of product was around 138–148 g (88 to 94.5%).

Each of the 27 experimental products and two polystyrene controls were subjected to color analysis to obtain either a Gardner color or Total Color Difference (ΔE). Tables I and II hereinbelow identify the copolymer employed, by reference to the monomer that complements the styrene within the copolymer, as well as the results of the Gardner color examination, in Table I, and Total Color Difference (ΔE) in Table II.

TABLE I

| Sample No. | Complementary Monomer | Percent by Weight Styrene | Gardner Color |
|---|---|---|---|
| 2 | methyl methacrylate | 80 | 1.0 |
| 3 | methyl methacrylate | 80 | <1.0 |
| 4 | methyl acrylate | 80 | 1.0 |
| 5 | ethyl acrylate | 80 | <1.0 |
| 6 | ethyl acrylate | 90 | <1.0 |
| 7 | ethyl acrylate | 95 | 1.0 |
| 8 | n-butyl acrylate | 80 | 1.0 |
| 9 | n-butyl acrylate | 80 | 1.0 |
| 10 | n-butyl acrylate | 84.4 | 1.0 |
| 11 | n-butyl acrylate | 84.4 | 1.0 |
| 12 | n-butyl acrylate | 80 | 1.0 |
| 13 | n-butyl acrylate | 80 | 1.0 |
| 14 | n-butyl acrylate | 80 | 1.0 |
| Control I | — | 100 | >1.0 |

TABLE II

| Sample No. | Complementary Monomer | Percent by Weight Styrene | ΔE Color |
|---|---|---|---|
| 1 | methyl methacrylate | 80 | 4.79 |
| 15 | ethyl acrylate | 80 | 10.78 |
| 16 | n-butyl acrylate | 80 | 7.25 |
| 17 | n-butyl acrylate | 80 | 8.02 |
| 18 | n-butyl acrylate | 90 | 8.39 |
| 19 | isodecyl methacrylate | 95 | 17.26 |
| 20 | isodecyl methacrylate | 90 | 9.45 |
| 21 | isodecyl methacrylate | 80 | 7.06 |
| 22 | lauryl methacrylate | 95 | 10.48 |
| 23 | lauryl methacrylate | 90 | 7.98 |
| 24 | lauryl methacrylate | 80 | 4.31 |
| 25 | stearyl methacrylate | 95 | 12.01 |
| 26 | stearyl methacrylate | 90 | 10.16 |
| 27 | stearyl methacrylate | 80 | 8.66 |
| Control II | — | 100 | 16.9 |

As should be evident from the foregoing data, the brominated copolymers of the present invention provide improved (lighter) colors. In particular, the data in Table II establishes a linear pattern of lower color as the percent of (meth)acrylate polymer in the polystyrene acrylate copolymer or polystyrene methacrylate copolymer is increased. It is to be noted that Sample No. 18 should be disregarded as its ΔE color indicates an error in testing or perhaps over bromination occurred. The experiment was not repeated and thus, the more expected, lower color value has not been reported.

Thus it should be evident that the bromination of copolymers of styrene and acrylate or methacrylate monomers according to the present invention is highly effective in preparing a brominated polystyrene additives for thermoplastics, which additives have improved color.

Based upon the foregoing disclosure, it should now be apparent that bromination of copolymers of styrene of acrylate or methacrylate monomers as described herein will achieve the objectives set forth hereinabove. It is, therefore, to be understood that any variations evident fall within the scope of the claimed invention and thus, the selection of specific component elements can be determined without departing from the spirit of the invention herein disclosed and described. Nor, is practice of the present invention necessarily limited to the use of the acrylate or methacrylate monomers disclosed or exemplified herein, the examples having been provided merely to demonstrate practice of the subject invention. Thus, the scope of the invention shall include all modifications and variations that may fall within the scope of the attached claims.

What is claimed is:

1. A flame retardant additive comprising:

a brominated copolymer consisting of a styrene and an acrylate or methacrylate monomer defined by the formula

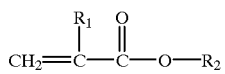

where $R_1$ is a methyl group or hydrogen and $R_2$ is an alkyl group having between one and about 18 carbon atoms, said copolymer being produced by bromination of the unbrominated copolymer and having a bromine content of at least about 52 percent by weight.

2. A flame retardant additive, as in claim 1, wherein said styrene component is selected from the group consisting of styrene monomers, halogenated styrene monomers, alkylated styrene monomers and mixtures thereof.

3. A flame retardant additive, as in claim 1, wherein said acrylate or methacrylate component is selected from the group consisting of acrylate and methacrylate esters in which the ester group contains one to four carbon atoms.

4. A flame retardant additive, as in claim 1, having a ΔE color as low as about 4 up to about 12.

5. A method of imparting flame retardancy to a thermoplastic material without deleteriously impacting the color thereof comprising the step of:

adding a brominated copolymer to the thermoplastic material, wherein the copolymer is a copolymer which consists of styrene and an acrylate or methacrylate monomer defined by the formula

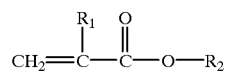

where $R_1$ is a methyl group or hydrogen and $R_2$ is an alkyl group having between one and about 18 carbon atoms, said copolymer being produced by bromination of the unbrominated copolymer.

6. A method as in claim 5, wherein said styrene component is selected from the group consisting of styrene monomers, halogenated styrene monomers, alkylated styrene monomers and mixtures thereof.

7. A method as in claim 5, wherein said acrylate or methacrylate component is selected from the group consisting of acrylate and methacrylate esters in which the ester group contains one to four carbon atoms.

8. A brominated copolymer comprising:

a copolymer which consists of styrene and an acrylate or methacrylate monomer defined by the formula

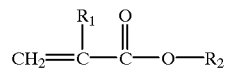

where $R_1$ a methyl group or hydrogen and $R_2$ is an alkyl group having between one and about 18 carbon atoms, said copolymer being produced by bromination of the unbrominated copolymer and having a bromine content of at least about 52 percent by weight.

9. A brominated copolymer, as set forth in claim 8, having a ΔE color as low as about 4 up to about 12.

10. A brominated copolymer, as set forth in claim 8, wherein said styrene component is selected from the group consisting of styrene monomers, halogenated styrene monomers, alkylated styrene monomers and mixtures thereof.

11. A brominated copolymer, as set forth in claim 8, wherein said acrylate or methacrylate component is selected from the group consisting of acrylate and methacrylate esters in which the ester group contains one to four carbon atoms.

* * * * *